Aug. 16, 1932.  S. M. DECKER  1,871,446
ELECTRIC HAMMER
Filed April 24, 1928  4 Sheets-Sheet 1
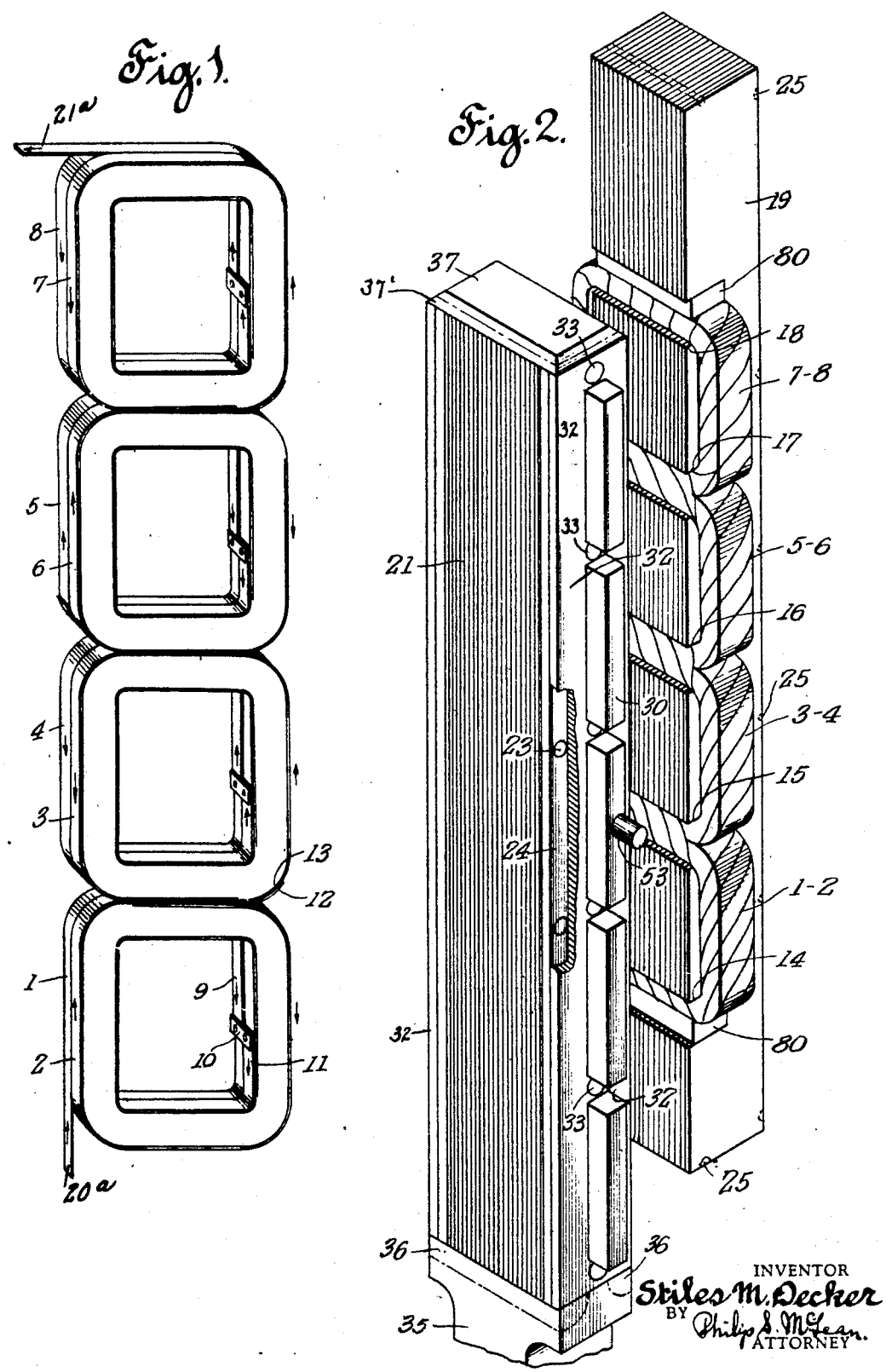

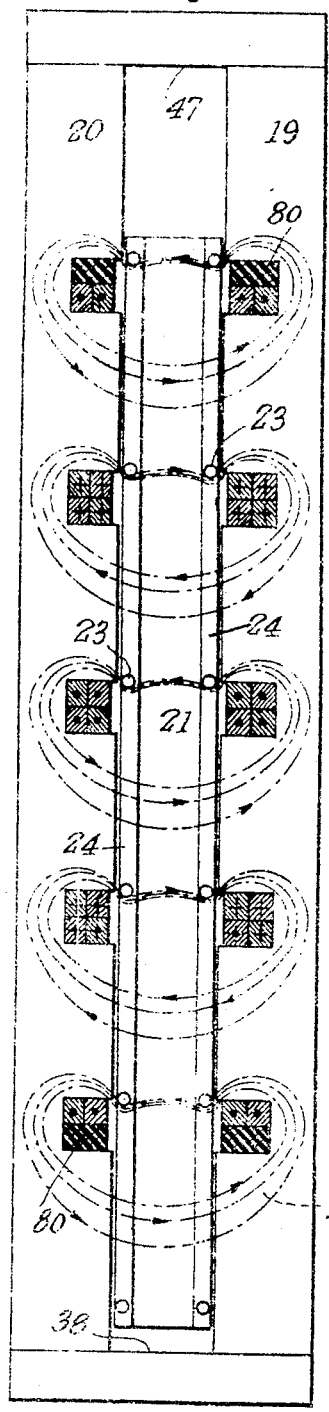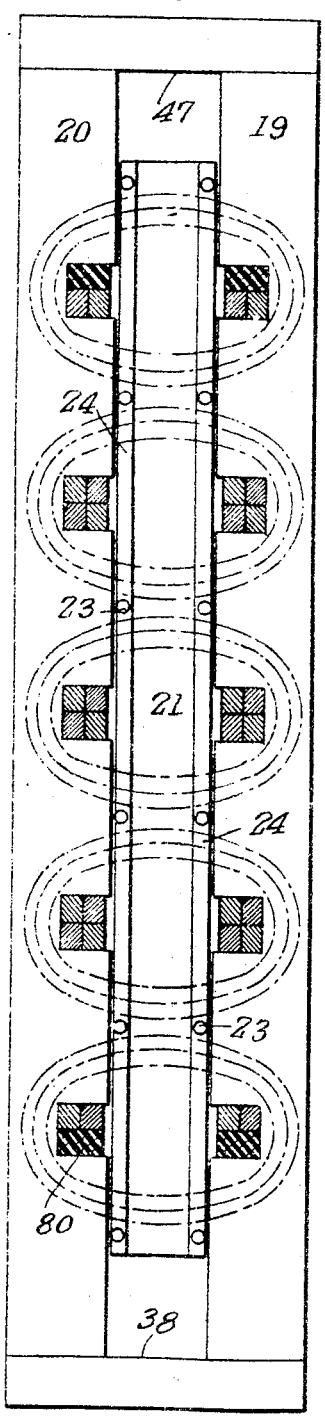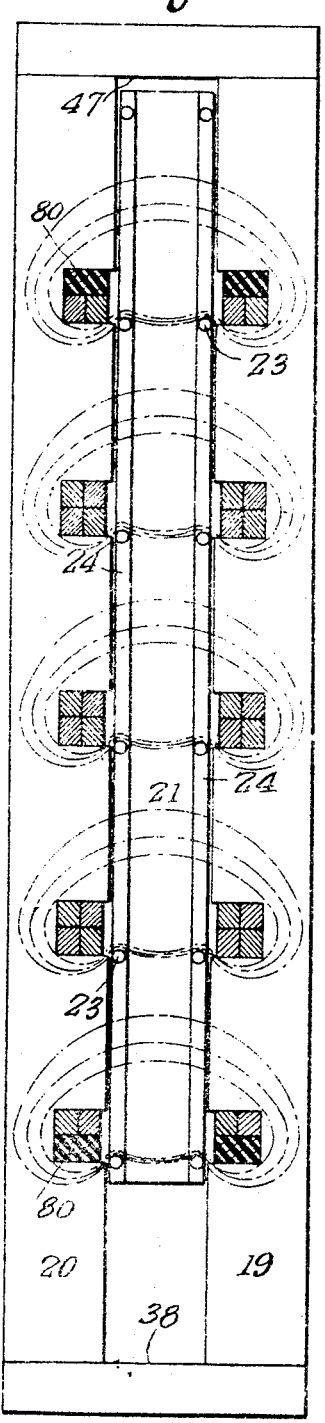

Aug. 16, 1932.  S. M. DECKER  1,871,446
ELECTRIC HAMMER
Filed April 24, 1928  4 Sheets-Sheet 3
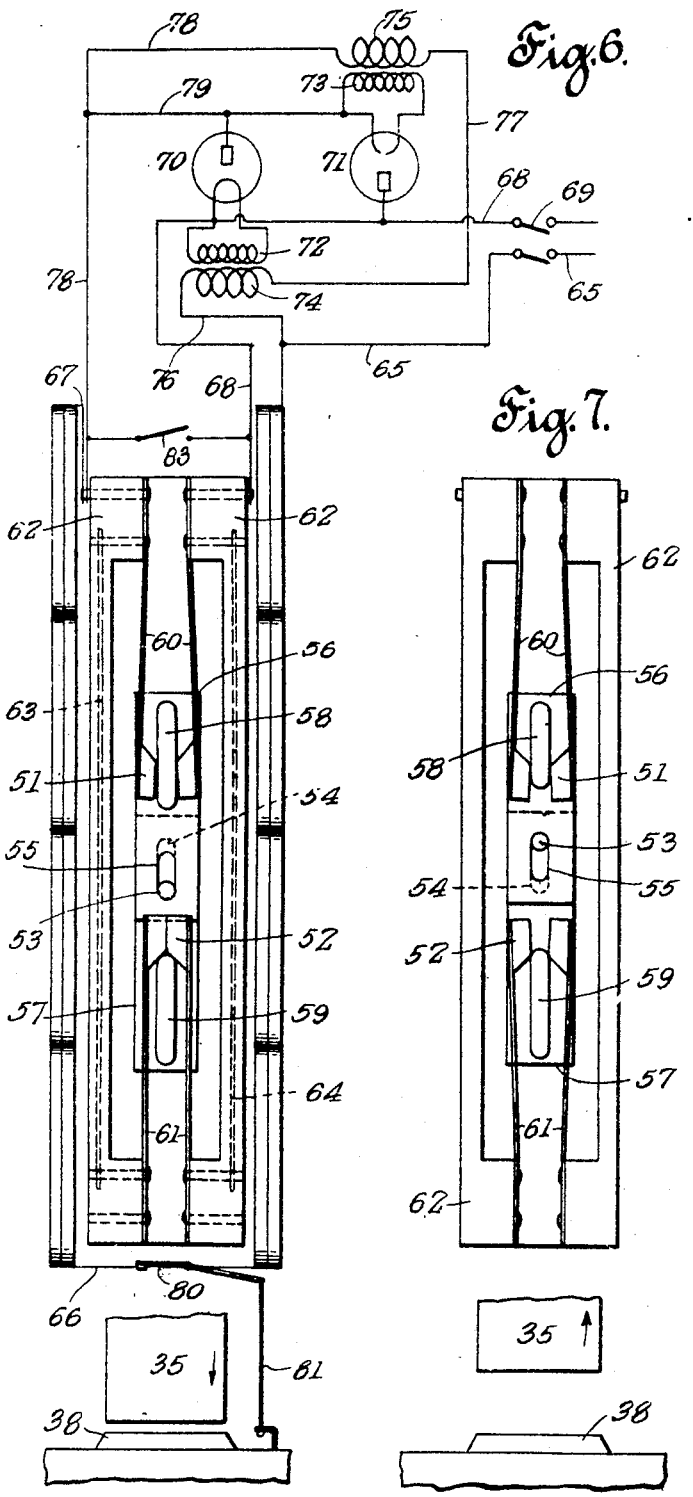
Stiles M. Decker INVENTOR
BY Philip S. McLean ATTORNEY Aug. 16, 1932.   S. M. DECKER   1,871,446
ELECTRIC HAMMER
Filed April 24, 1928   4 Sheets-Sheet 4
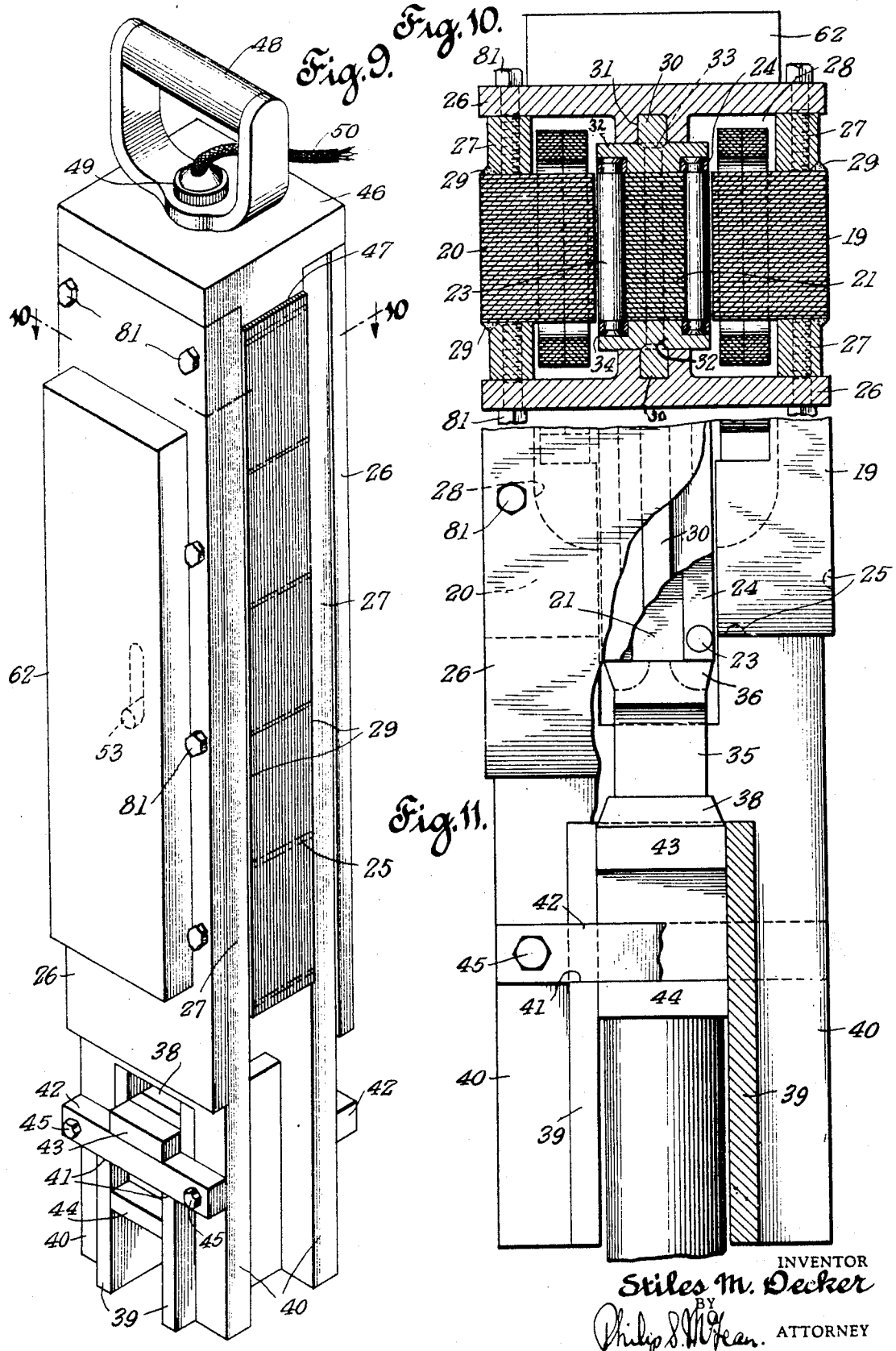
INVENTOR
Stiles M. Decker
BY
Philip S. McKean  ATTORNEY Patented Aug. 16, 1932

1,871,446

UNITED STATES PATENT OFFICE

STILES M. DECKER, OF LEONIA, NEW JERSEY

ELECTRIC HAMMER

Application filed April 24, 1928. Serial No. 272,372.

This invention relates particularly, though not exclusively to electric motors of the reciprocating type.

Special objects of the invention are to provide a practical and efficient motor construction for operating hammers, drills, pumps and other reciprocating types of machines, and particularly one which will start and run on single phase alternating or pulsating current without the aid of phase-splitting devices or other auxiliaries, which will have a high starting power, which can be controlled in its operation independently of the frequency of the energizing circuit, which will be economical in current consumption and will be of simple, sturdy and inexpensive construction.

The foregoing and other desirable objects are attained by utilizing in a practical way the electro-magnetic and electro-dynamic forces resulting from primary and secondary windings on the two relatively movable members of the motor, arranged in inductive and magnetic relation and controlled to utilize the repulsive magnetic forces for effecting the desired movements. The invention involves also certain timing relations by which a dynamic braking effect is produced in the reciprocating form of motor to cushion and start the reciprocating member of the motor on its return stroke, also in combination with the above, special control means and arc suppressing devices.

Various other novel features of the invention, constructions, combinations and relations of parts will appear as the specification proceeds.

The drawings accompanying and forming part of the specification illustrate one practical embodiment of the invention, but it should be understood that the structure may be modified and changed as regards this particular disclosure without departure from the true spirit and broad scope of the invention as hereinafter defined and claimed.

Fig. 1 is a perspective view illustrating one set of the stator coils of the machine; Fig. 2 is a similar view showing the coils set in the stator and showing the movable ram in front of the same; Figs. 3, 4 and 5 are front views of the ram in the stator structure, and showing respectively the ram in the lower starting position, the ram in the intermediate "neutral" position, and the ram in the upper position at the start of the down stroke.

Figs. 6, 7 and 8 are views similar to Figs. 3, 4 and 5, but showing the circuit and contact control mechanism in the three following positions: Fig. 6, ram on down stroke at instant contact is made for return stroke, Fig. 7, ram approaching neutral on up-stroke, Fig. 8, ram on up-stroke at instant circuit is closed for applying dynamic braking effect and starting it back on down stroke; Fig. 9 is a perspective view of the complete hammer; Fig. 10 is an enlarged cross-sectional view of the hammer structure as on substantially the plane of line 10—10 of Fig. 9; Fig. 11 is a broken side elevation showing particularly the anvil construction at the foot of the hammer.

In order that the structure and operation may be the more readily understood, the arrangement of the stator or energizing windings is illustrated first in an elemental way, Fig. 1, and then as mounted in the stator and co-operating with the secondary winding of the ram or movable element.

Referring first to Fig. 1, each stator winding consists in the construction disclosed of pairs of coils 1—2, 3—4, 5—6, 7—8, with the coils of each pair connected in series in like relation, and the adjacent pairs connected in series in reverse relation. The coil units are shown as all alike, and consisting each of a flat tape conductor wound on itself in rectangular form, and the coils of each pair disposed side by side with the inner end 9 of the first coil of a pair connected by a cross strap 10 with the inner end 11 of the second coil of the pair, and the outer end 12 of said second coil lapped over and connected with the outer end 13 of the first coil of the next pair, the coils of adjacent pairs standing in reversely wound relation, so that these outer terminal ends stand in position to be lapped in this fashion.

With the construction described, the coils may all be wound alike, then be made up in pairs by placing two coils side by side, but in reversely wound relation and connecting the inner ends of the two, so as to effect a series cumulative relation. The two coils thus connected as a single unit may then be connected in relatively reversed relation with the next unit-connected pair of coils, the individual coils and coil units being suitably taped or otherwise properly insulated after the manner indicated in Fig. 2, in which the parallel end sections of the coils are shown seated in slots 14, 15, 16, 17, 18 in the laminated stator structure 19. The direction of current flow is indicated by arrows in Fig. 1, from which it will be seen that with the terminal ends 20a, 21a connected in circuit, the flow of current through all the conductors in each slot will be in the same direction, and that the flow in adjacent slots will be in reverse directions.

In the form of construction disclosed, there are two stator elements 19, 20 placed opposite as in Fig. 3 with the ram indicated generally at 21 operating therebetween, and with the coils arranged and connected as indicated in that view with the current flowing in the same directions in the slots at opposite sides of the ram, so as to produce the cross-magnetic fields indicated by the flux lines 22.

The ram 21 is illustrated as a laminated magnetic body guided for reciprocation between the stator elements and carrying in the opposite surfaces of the same, copper, or other good conducting, bars 23 connected together at their ends by longitudinal bars 24 of copper, or other good conducting material, forming grids or secondary windings in inductive relation to the stator windings. The bars 23 of these grids are shown as spaced substantially in accordance with the spacing of the stator slots. In practise, these grid bars may be seated in holes drilled through the ram close to the surface of the same, but if desired, these seats may be slots open to the opposite surfaces of the ram.

In the commercial embodiment of the invention illustrated more particularly in Figs. 9, 10 and 11, the stator or field laminations are secured together by cross welds 25, and the two stator sections are secured together in properly spaced relation between side frames or plates 26, longitudinal bars 27 being shown interposed between the laminations and side frames to provide space 28 for the side portions of the coils, and welds 29 being shown for securing the stator laminations, spacers and side frames integrally together.

Positive guiding of the ram is effected in the illustration by providing it with longitudinal ribs or flanges 30 on opposite sides sliding in guide grooves 31 on the inner sides of the frame plates. These guide flanges are shown as carried by the side plates 32 secured together by headed studs 33 and shouldered in their inner edges at 34 to overstand and protect the longitudinal and transverse grid bars.

The ram is shown as carrying a suitable hammer head 35 on its lower end secured integrally thereto by welds 36 and as provided at its upper end with a welded-on cap piece 37.

The welding of the hammer head and cap piece to the body of the ram simplifies manufacture, but what is probably of more consequence, eliminates any possibility of relative motion of the ram structure. This is most important for the reason that the ram necessarily is subjected to severe battering and by overcoming the possibility of relative motion between the component parts, looseness is avoided. The welding of the parts positively prevents any relative motion between component parts and this enables the ram structure to be built up in the laminated form, instead of solid as heretofore proposed. As a practical result therefore, the welding enables the use of laminations in that part of the ram which is subjected to fluctuating or alternating magnetic fluxes.

A loose anvil piece 38 is shown guided for vertical sliding movements in the lower end of the frame between guide plates 39 secured across bifurcated lower portions 40 of the side frames, these guide plates being shown in Fig. 9 as extended out at the sides of the frame plates to provide shoulders 41 on which rest the stop bars 42. The anvil is shown as having upper and lower flanges 43, 44 extending out over these stop bars, and whereby it is slidingly confined in the lower end of the machine. The stop bars are shown as mounted by through bolts 45, which further serve to brace and reinforce the lower end of the hammer. The plates 39 in addition to guiding the anvil, also aid in the placing of the hammer over sheet piling or the like.

At the top, the side frames are shown as braced and connected by a top plate 46, which has an intermediate portion 47 extending down between the side frames and serving as a striker plate for the ram head 38.

The handle 48 is shown provided on the top plate by which the hammer may be lifted and manipulated. Protected by this handle, there is shown a plug 49 by which the operating current is supplied to the machine from the conductor cable 50, and a suitable switch for controlling the machine may be incorporated in or associated with this handle or plug construction.

The hammer action is governed in the present disclosure by the control mechanism illustrated in Figs. 6 to 9, and comprising an upper set of contacts 51, and a lower set of contacts 52, forming switches connected in parallel series relation with the energizing coils, and actuated in properly timed relation from the ram. This timing is shown as accomplished by a pin or stud 53 on the side of the ram, extending through slots 54, 55 in the overstanding slides 56, 57, which latter carry the insulating separators 58, 59, operating between the switch contacts 51, 52, respectively. The switch contacts are shown as carried by long flexible springs 60, 61, enabling quick easy action of the switches. These switch springs are mounted on suitable insulating supports 62, and the contacts of the two switches are joined in parallel relation by connections 63 at one side and connections 64 at the opposite side.

The circuit connections may be made as follows:

From one side 65 of the single phase alternating current supply line to one set of the field windings, and by a cross-connection 66 to the other set of field windings, and from the far end of said second field windings by connection 67 and bus 63 to the left-hand switch contact; the right hand switch contacts, joined by bus 64 are connected by conductor 68 with the other side of the A. C. line. This main supply circuit may be controlled by a suitable switch indicated at 69.

Arc suppressing vacuum tubes are shown at 70, 71, connected across the line in reversed order, but both in parallel with the automatic switches. The filaments of these tubes are shown as energized from the secondary windings 72, 73 of transformers, whose primary windings 74, 75, are connected by wiring 76, with one side of the line 65, said primaries being connected together in series by wiring 77, and by wiring 78 with the left-hand switch contacts, so that with either of the automatic switches closed, current will flow through the transformer primaries, returning to the other side of the line across the closed switch, and by way of the return connection 68. The filament of tube 70 and plate of tube 71 are shown connected with conductor 68 forming the return side of the line, and the plate of tube 70 and filament of tube 71 are shown connected by wiring 79 with conductors 78, 77 and 76 with the opposite side of the contactors. With this arrangement, the discharge across the contactors at the instant of breaking circuit is taken care of by the tubes and arcing at the switch contacts is accordingly reduced or suppressed. This arc suppressor mechanism is shown only in a general way, various details being omitted, the structure being covered by a separate application for patent.

From the foregoing, the operation will be clear, particularly by reference to Figs. 3 to 8.

In Figs. 3 and 6, the ram is shown just approaching the bottom of its stroke, and about to strike the anvil. At this time, the pin 53 on the ram, by engagement with the lower ends of slots 54 and 55 has pulled both slides 56, 57 downwardly far enough to cause the upper separator 58 to spread the upper switch contacts 51 and the lower separator 59 to permit the lower switch contacts 52 to come together. Circuit through the energizing winding is thereby completed by the lower switch, and the magnetic fields shown diagrammatically in Fig. 3 are thereby established. The resultant fluxes of the primary and secondary windings at this time exert a lifting force on the ram, which is equal to the sum of the magnetic attraction or solenoid action at the upper end of the ram and the repulsion of the magnetic fluxes of the primary and secondary windings. As a consequence, as the hammer strikes its blow, it is acted on by these powerful electro-magnetic and electro-dynamic forces, throwing the ram upward on the rebound.

As the ram in its upward travel approaches and reaches a position like that shown in Fig. 4, a neutral condition results from the symmetrical relation of the parts and the symmetrical magnetic fields then produced. With current on, as by means of a special switch, the ram can be sustained and held in this intermediate neutral position, but with the automatic switch mechanism disclosed, the circuit is interrupted just before the neutral point is reached, as illustrated in Fig. 7, where both sets of switch contacts are open, and this open circuit condition continues until the ram is about at the top of its stroke, whereupon, as shown in Fig. 8, the upper switch closes by the passing of separator 58 from between contacts 51, and the magnetic and dynamic reaction shown in Fig. 5 is thereby established. As shown in this view, the fluxes from the field coils loop over the grids of the ram windings, effecting a powerful downward repulsion, which in this case, also is aided by the purely magnetic or solenoid action of the lower end of the ram. In the down stroke, as in the up stroke, the circuit is interrupted before the neutral point is reached, but by the upper separator 58 opening the switch contacts 51, while switch 52 is still held open by separator 57.

By properly timing the contacts, a dynamic braking effect may be introduced at the top or at the bottom of the stroke, and by varying the length of contact periods, the force of the stroke in either direction may be governed to suit different requirements. By utilizing the force of the rebound, very little energy may be used to return the hammer, and the main force be put into the down stroke.

An important feature of interrupting the circuit before the neutral point is reached, is that the self-induction and counter induced electromotive force become greatest and hence the current flow is least as the neutral position is approached, so that the circuit can be broken at such time without dangerous arcing, and such arcing as might occur is taken care of in the present disclosure by the arc suppressors above described.

To prevent injury and useless expenditure of energy when the hammer is lifted off the piling or other object, the action may be automatically cut off as by means of a cut-off switch indicated at 80 in Fig. 6, and shown as connected by lost motion linkage 81 with the anvil, so that if the anvil drops below its proper level, as it would if the hammer were lifted off the piling, the energizing circuit will be automatically interrupted. This automatic cut-out, if desired, may be used as a starting and stopping switch for controlling the hammer.

As shown in Figs. 3 to 5 inclusive, a complete magnetic circuit is provided for all the coils of the stator in all positions of the ram, so that a maximum, mechanical effort is produced with a minimum consumption of energy. This construction gives the machine a high starting power and a generally high efficiency. The starting and operation is accomplished on single phase current entirely without phase splitting devices, starting windings or other accessories. The speed of operation is entirely independent of the frequency of the energizing current, and may be made faster or slower as required by proper use of current, and by proper timing of the current impulses. By varying the extent of lost motion between the contact slides and the actuating pin on the ram, and by varying the positions of the two sets of contacts relative to each other, and relative to the ram, the timing, the force of the blows, and the cushioning effect may all be regulated as desired. The structure is simple and strong, and being substantially square in cross-section is compact, and can be used in places where operating space is quite limited. Because of the inherent efficiency of the machine, and the fact that the circuit is interrupted at the moments of greatest self-induction and least current flow, the drain on the line is not excessive at any time, and the machine may be used practically on any single phase line.

By provision of special switch means to hold the circuit closed independently of the time contacts, as indicated at 83, Fig. 6, the ram may be held suspended in the neutral position shown in Fig. 4, and this without excessive current, as such position is the condition of minimum current consumption. A slower lift of the ram may be attained by starting the ram with the inductor bars nearer to the neutral position, that is at a point between those shown in positions Figs. 3 and 4. This condition may be effected by using an anvil having a higher striking face, or by adding to the length of the hammer face on the ram. The relatively long ram gives weight, and hence power with short hammer strokes. By timing the contacts to catch the ram on the rebound, the energizing current required to lift the ram may be quite moderate. By closing the circuit an appreciable time before the ram reaches the top of its stroke, the dynamic braking effect is utilized to cushion the up-stroke, returning energy to the line at this time, and to start the ram back with a powerful down stroke. If desired, the maximum or an equal cushioning effect may be introduced at the bottom stroke of the ram.

The ram rests on the anvil when the hammer is placed over the piling, and hence the anvil determines the position of the induced current bars relative to the exciting coils at the start. The maximum starting force is obtained by having these induced current bars slightly above the center of the stator slots, about as indicated in Fig. 3, and correspondingly the stop in the head of the hammer determines the top stroke of the ram, the maximum power for the down stroke being obtained by having the induced current bars of the ram at the start just below the center of the coils as indicated in Fig. 5. The inductor bars of the ram form grids, which are effective throughout the major portions of the ram strokes, it being observed that the end grid bars alternately lose in efficacy by passing out of the magnetic fields, only at the ends of the ram strokes.

The composite ram structure is made particularly strong and rugged by welding the end pieces thereto, and by having these welds united with the ends of the laminations and also with the ends of the reinforcing side plates as well. Fig. 2 in particular shows how the welds 36 extend out over the lower ends of the side plates at the bottom of the ram and the same feature is shown at the top in this view, where 37' indicates the welds uniting the cap plate to the ends of the laminations and also to the ends of the side plates. The through bolts 33 which may be secured by being headed over or riveted, serve to further unify the structure at points intermediate the ends. The grid bars 23 may be cast or fused in place, so as to provide an absolute fit and hence eliminate any possibility of looseness. Filler pieces are indicated at 80 for holding the end turns of the upper and lower coils in place as shown in Fig. 2, and suitable wedges may be provided closing the slots over the windings in the manner that the coil slots are closed over the coils in the field structure of rotary motors. The side plates 26 of the machine are shown as secured removably to the stator structure by bolts 81, so as to permit access to the coils and to the ram structure if the same be necessary at any time.

What is claimed is:

1. A variable speed self-starting electric motor operable by single phase alternating current without phase splitting or special starting devices, said motor comprising magnetic bodies guided one for travel in a definite path relative to the other, a primary winding carried by one body, a closed secondary carried by the other body in inductive relation to the primary winding, and means for energizing said primary winding at such a time in the relation of said relatively movable bodies that the magnetic fluxes resulting from the primary and secondary will react, and by their mutual repulsion will move the travelling magnetic body in the direction in which it is guided to travel and means for arbitrarily varying the timing of the repulsive reactions independently of the frequency of the single phase exciting current.

2. A variable speed self-starting single phase electric motor operable without phase splitting or other special starting devices, and comprising magnetic bodies guided for travel in a definite path, one relative to the other, a primary winding carried by one of said bodies, a closed secondary carried by the other body in position for induction of secondary currents therein from the primary, and means for energizing the primary at a time when the secondary is offset therefrom in such relation that the resultant primary and secondary fluxes will react repulsively to effect movement of the magnetic body, which is free to travel in the direction in which it is guided for movement and means for arbitrarily varying the timing of the repulsive reactions independently of the frequency of the single phase exciting current.

3. A variable speed self-starting single phase electric motor, operable without phase splitting or other special starting devices, and comprising magnetic bodies guided for travel in a definite path, one relative to the other, a single phase primary winding carried by one of said bodies, a single phase closed secondary carried by the other body in position for induction of secondary currents therein from the single phase primary, and means for energizing the primary with single phase alternating current at a time when the secondary is offset therefrom in such relation that the resultant primary and secondary fluxes will react repulsively to effect movement of the magnetic body, which is free to travel in the direction in which it is guided for movement, and for interrupting the primary circuit at a time in the continued relative movement of the magnetic bodies, while said magnetic fluxes are in the same repulsive relation.

4. An electric hammer, comprising a magnetic ram guided for reciprocating movement, transverse secondary conductor bars carried by said ram, stator members at opposite sides of said ram and having coil slots in the faces of the same opposed to the ram, said coil slots being spaced the same distances apart as adjoining conductor bars on the ram, single phase primary circuit windings in said coil slots and means for controlling current in said windings for dynamically cushioning the movements of the ram.

5. A single phase electric hammer operating on the dynamic principle and comprising magnetic bodies guided for travel in a definite path one relative to the other, spaced secondary conductor bars carried by one of said magnetic bodies, the other magnetic body having coil slots opposed to said conductor bars and spaced the same distances apart as adjoining conductor bars on the first body, a single phase primary winding located in said slots and means for automatically energizing said primary winding in properly timed relation of the two relatively movable bodies to effect mutual repulsion of said bodies.

6. A single phase electric hammer operating on the dynamic principle and comprising magnetic bodies guided for travel in a definite path one relative to the other, spaced secondary conductor bars carried by one of said magnetic bodies, the other magnetic body having coil slots opposed to said conductor bars and spaced the same distances apart as adjoining conductor bars on the first body, a single phase primary winding located in said slots, means for automatically energizing said primary winding in properly timed relation of the two relatively movable bodies to effect mutual repulsion of said bodies and including a circuit controller timed to effect a dynamic braking of the relatively movable bodies.

In testimony whereof I affix my signature.
STILES M. DECKER.